No. 686,742. Patented Nov. 19, 1901.
A. L. KULL.
VEHICLE FRAME.
(Application filed Mar. 20, 1901.)
(No Model.) 2 Sheets—Sheet 1.
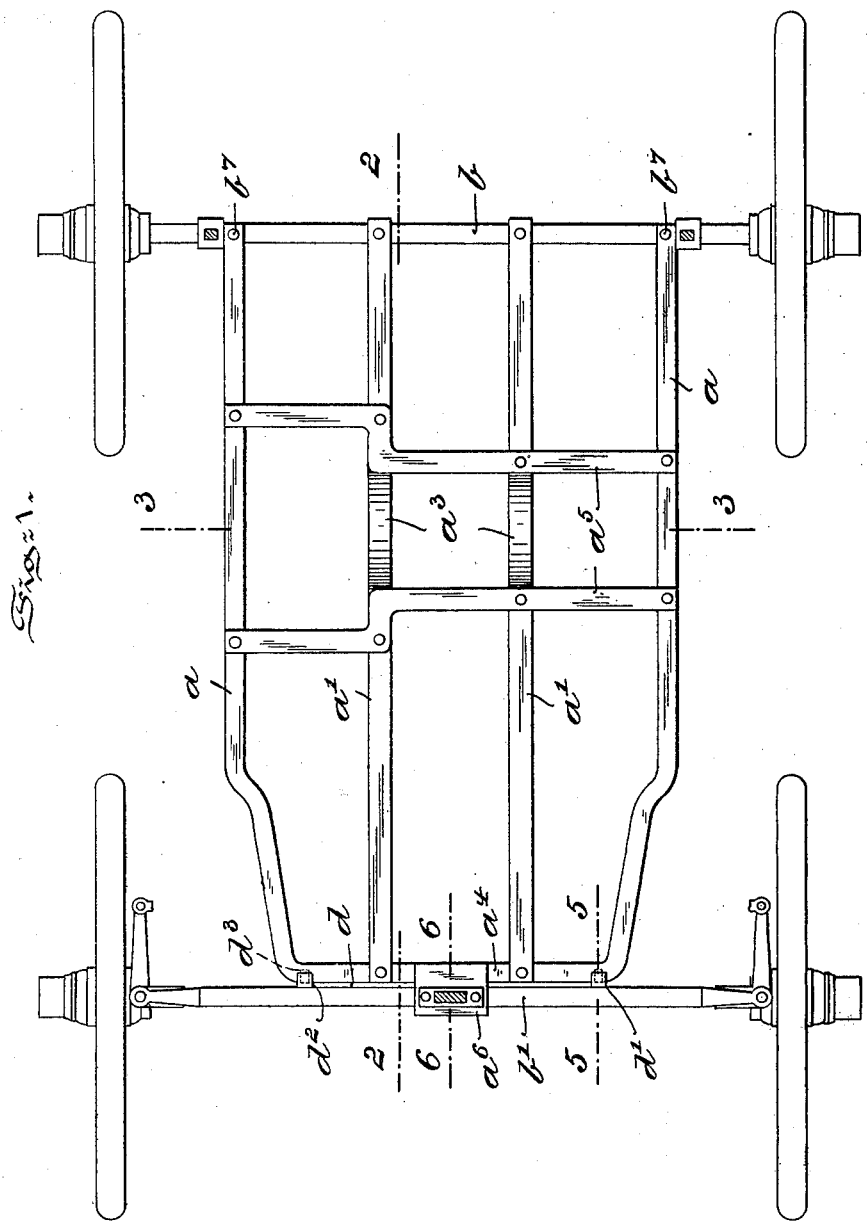

No. 686,742. Patented Nov. 19, 1901.
A. L. KULL.
VEHICLE FRAME.
(Application filed Mar. 20, 1901.)
(No Model.) 2 Sheets—Sheet 2.
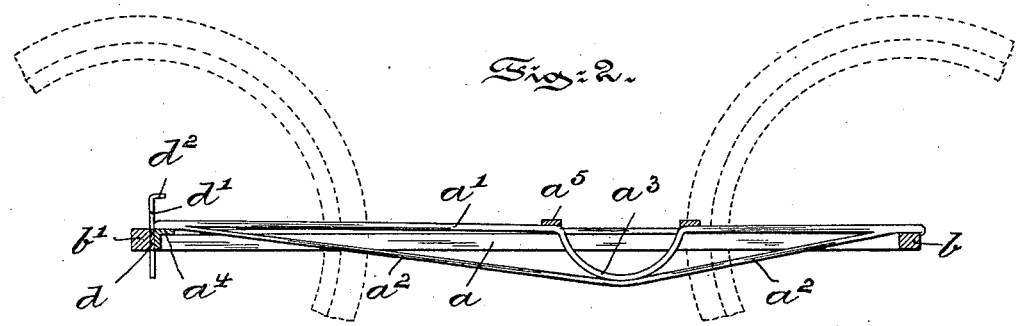
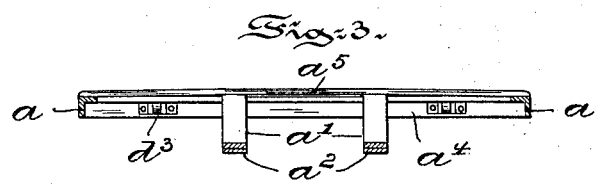
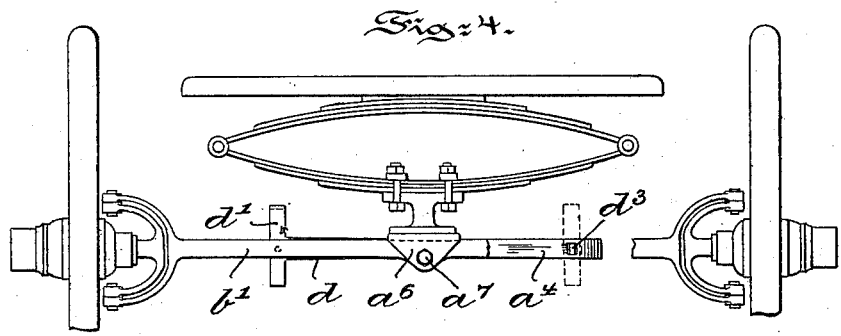
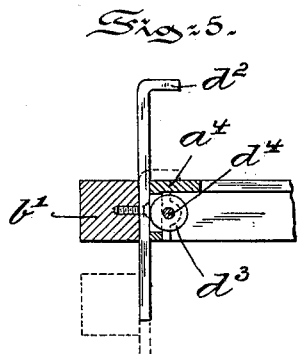
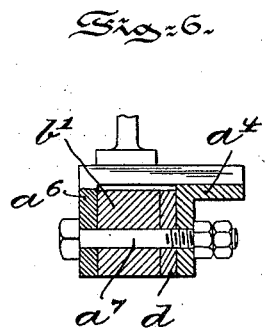
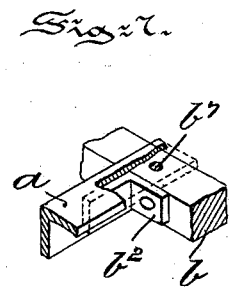
Witnesses
Wilhelm Vogt
Thomas M. Smith
Inventor
Albert L. Kull,
By J. Walter Douglas
Attorney

UNITED STATES PATENT OFFICE.

ALBERT L. KULL, OF CAMDEN, NEW JERSEY.

VEHICLE-FRAME.

SPECIFICATION forming part of Letters Patent No. 686,742, dated November 19, 1901.

Application filed March 20, 1901. Serial No. 51,980. (No model.)

*To all whom it may concern:*

Be it known that I, ALBERT L. KULL, a citizen of the United States, residing at Camden, in the county of Camden and State of New Jersey, have invented certain new and useful Improvement in Vehicle-Frames, of which the following is a specification.

My invention has relation to a framework whereon the body of a vehicle may be supported and by means of which the front and rear axles may be connected, and in such connection it relates to the construction and arrangement of said framework.

The principal object of my invention is to provide a strong light framework for vehicles, and particularly adapted for use in automobile construction, in which the frame should not only be light, strong, and simple in construction, but also relatively inexpensive to construct and connect to the other parts of the vehicle.

The nature and scope of my invention will be more fully understood from the following description, taken in connection with the accompanying drawings, forming part hereof, in which—

Figure 1 is a top or plan view of the framework embodying main features of my invention and of the front and rear axles and wheels connected by said framework. Fig. 2 is a longitudinal sectional view on the line 2 2 of Fig. 1. Fig. 3 is a cross-sectional view on the line 3 3 of Fig. 1. Fig. 4 is a front elevational view of the front axle and auxiliary parts, a portion of the axle being broken away to better illustrate one of the bearings or friction-rollers upon which the axle is adapted to oscillate. Figs. 5 and 6 are enlarged detail sections taken on the lines 5 5 and 6 6, respectively, of Fig. 1; and Fig. 7 is an enlarged perspective detail of one of the connections between the framework and rear axle.

Referring to the drawings, the framework of the vehicle comprises a main frame $a$, which in plan is shaped like a yoke or U and is made of angle-iron in cross-section substantially inverted-L shape. The free ends of the main frame $a$ are bolted or otherwise secured directly to the rear axle $b$. A preferred manner of connecting these ends to the axle $b$ is illustrated in Fig. 7. The depending or vertical flange of the angle-iron is cut out or recessed, so as to permit the top or horizontal flange to rest upon the top of the axle $b$. A bolt $b^7$ is passed through this flange and the axle $b$, and an angular brace $b^2$ is secured to the vertical flange of the frame $a$ and to the side of the axle $b$ by means of bolts, rivets, or welding, as desired. The yoke or main frame $a$ is reinforced or strengthened by means of longitudinally-arranged truss-like braces $a'$, the preferred construction of which is clearly illustrated in Fig. 2. These braces $a'$ have an angular or downwardly-projecting arch-piece $a^2$ spanning the ends of the braces, and the top or brace $a'$ proper is downwardly bellied or bowed, as at $a^3$, to form a support vertically for the arch-piece $a^2$. The braces $a'$ are united at one end directly to the rear axle $b$ and at the other end to the front portion $a^4$ of a yoke $a$ in any suitable manner. In addition to the longitudinal truss-like braces $a'$ the yoke or main frame $a$ is also connected to the cross pieces or braces $a^5$, which by preference span the truss-like braces at about the portions adjacent to the arch-pieces $a^2$. These cross-braces $a^5$ are secured at their ends to the main frame $a$ and intermediate of their ends to the truss-like braces $a'$. The framework for the vehicle therefore consists of a main or yoke-like portion $a$, reinforced longitudinally by truss-like braces $a'$ and reinforced laterally by the cross-braces $a^5$. The free ends of the main portion or frame $a$ are secured directly to the fixed axle $b$ of the vehicle, which in the instance illustrated in the drawings is also the rear axle, and the longitudinal truss-like braces $a'$ are also secured at one of their ends directly to said axle $b$. There is thus formed a very strong, rigid, and comparatively inexpensive framework, which while light in weight is adapted to support a very heavy body of the vehicle, and hence is well adapted for use in automobiles, and which framework is also adapted to carry the motive power. The front portion $a^4$ of the main frame $a$ is pivotally connected intermediate of its arms to the front or oscillating axle $b'$, preferably in the manner illustrated in Fig. 6—that is, the front portion $a^4$ is provided with an angle-bracket $a^6$, which lies upon the top of the axle $b'$ and also along the front side of said axle, and a king-bolt $a^7$ is passed through the downwardly-projecting flange of the angle-bracket $a^6$. The front or oscillating axle $b'$ is by means of this construction permitted to have an oscillating play upon the king-bolt $a^7$ in a vertical plane. Between the inner side of the axle $b'$ and the portion $a^4$ of the main frame $a$ and pinned or otherwise secured to the axle $b'$ is arranged an arm $d$, having at either end a vertically-arranged bar $d'$, projecting above and below the front portion $a^4$. The upper end of each bar $d'$ is rearwardly bent or curved to form a projection or stop for the stops $d^2$, adapted, respectively, to strike alternately upon the front portion $a^4$ as the axle $b'$ oscillates, and thus serve to limit the range of movement of the axle $b'$ upon its pivot—the king-bolt $a^7$. Inasmuch as the axle $b'$ in oscillating will ride more or less upon the downwardly-projecting flange of the front portion $a^4$ of the frame $a$, to lessen the friction upon said front portion $a^4$ there are arranged on the front portion $a^4$, adjacent to the ends of the arm $d$, two friction-rollers $d^3$, on which the axle $b'$ and arm $d$ may ride with little or no friction. The preferred arrangement of these rollers $d^3$ is illustrated in Fig. 5, and consists in supporting the rollers $d^3$ upon a shaft $d^4$, which in turn is fixed in any suitable manner to the frame $a$ back of the vertical flange, and the rollers $d^3$ are permitted to project through recesses cut through the vertical flange of the front portion $a^4$ of the main frame.

Having thus described the nature and object of my invention, what I claim as new, and desire to secure by Letters Patent, is—

1. A framework for vehicles, comprising a main frame substantially U shape in plan and formed of angle-iron, the free ends of said main frame being secured directly to one of the axles of the vehicle, and one or more truss-like braces arranged longitudinally in the frame, each truss-like brace consisting of a top portion united at its ends respectively to the main frame and to the axle to which the free ends of the main frame are secured, a downwardly-projecting arched portion connecting the ends of the top portion and a downwardly-curved or angular portion projecting from the top portion and adapted to support the arched portion intermediate of its ends.

2. A framework for vehicles, comprising a main frame formed of angle-iron and having the free ends united directly to one of the axles of the vehicle, cross-braces spanning the main frame and united at either end to the sides of the main frame, and one or more longitudinally-arranged truss-like braces, each truss-like brace consisting of a top portion united at its ends respectively to the main frame and to the axle to which the free ends of the main frame are secured, a downwardly-projecting arched portion connecting the ends of the top portion and a downwardly-curved or angular portion projecting from the top portion and adapted to support the arched portion intermediate of its ends.

3. In a framework for vehicles, a truss-like brace, consisting of a top portion, a downwardly-projecting arched portion united at either end to the top portion, and a downwardly-curved or angular portion projecting from the top portion and adapted to support the arched portion intermediate of its ends, substantially as and for the purposes described.

4. In a framework for vehicles, a main frame of substantially U shape in plan and formed of angle-iron, the front portion of said frame being straight and arranged parallel to one of the axles, the free ends of said frame being secured directly to the other axle, a king-bolt pivotally connecting the front portion to its adjacent axle, one or more friction-rollers pivoted in the front portion of the frame and forming a bearing between said front portion and adjacent stationary parts carried by the front axle, and one or more truss-like braces arranged longitudinally in the frame and each comprising a top portion connected at one end to the front portion of the frame and at the other end to one of the axles, a downwardly-projecting arched portion connecting the ends of the top portion and a downwardly-curved or angular portion projecting from the top portion and adapted to support the arched portion intermediate of its ends.

In testimony whereof I have hereunto set my signature in the presence of two subscribing witnesses.

ALBERT L. KULL.

Witnesses:
J. WALTER DOUGLASS,
THOMAS M. SMITH.